(12) United States Patent
Lee et al.

(10) Patent No.: US 12,273,610 B2
(45) Date of Patent: Apr. 8, 2025

(54) DISPLAY DEVICE AND HEAD MOUNTED DISPLAY DEVICE

(71) Applicant: SAMSUNG DISPLAY CO., LTD., Yongin-si (KR)

(72) Inventors: Ji Won Lee, Yongin-si (KR); Sang Ho Kim, Yongin-si (KR); Soo Min Baek, Yongin-si (KR); Ju Youn Son, Yongin-si (KR); Cheon Myeong Lee, Yongin-si (KR); Bek Hyun Lim, Yongin-si (KR); Ju Hwa Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 83 days.

(21) Appl. No.: 18/224,176

(22) Filed: Jul. 20, 2023

(65) Prior Publication Data
US 2024/0107143 A1 Mar. 28, 2024

(30) Foreign Application Priority Data
Sep. 22, 2022 (KR) .......... 10-2022-0120343

(51) Int. Cl.
*H04N 23/54* (2023.01)
*G02B 27/00* (2006.01)
(Continued)

(52) U.S. Cl.
CPC .......... *H04N 23/54* (2023.01); *G02B 27/0093* (2013.01); *H04N 23/20* (2023.01); *H04N 23/55* (2023.01); *H04N 23/57* (2023.01)

(58) Field of Classification Search
CPC ........ H04N 23/54; H04N 23/57; H04N 23/20; H04N 23/55; G02B 27/0093
See application file for complete search history.

(56) References Cited

U.S. PATENT DOCUMENTS 10,268,290 B2 4/2019 Trail et al.
11,231,580 B2 1/2022 Zhang et al.
(Continued)

FOREIGN PATENT DOCUMENTS

KR 102219245 3/2016
KR 1020170104604 A 9/2017
(Continued)

*Primary Examiner* — Thai Q Tran
*Assistant Examiner* — Jose M Mesa
(74) *Attorney, Agent, or Firm* — CANTOR COLBURN LLP

(57) ABSTRACT

A display device includes a display portion including a first surface, from which light is emitted in a first direction, and a second surface opposite to the first surface, a first optical portion disposed on the first surface, and a second optical portion disposed on the first surface to be spaced apart from the first optical portion in a second direction crossing the first direction. Each of the first and second optical portions includes a multi-channel lens through which the light from the first surface passes, a first infrared light source, a first camera, and a first lens frame coupled to the multi-channel lens in the first direction to support at least a portion of the multi-channel lens. The first lens frame may include a first recess structure in which the first infrared light source is disposed and a second recess structure in which the first camera is disposed.

20 Claims, 7 Drawing Sheets

(51) Int. Cl.
*H04N 23/20* (2023.01)
*H04N 23/55* (2023.01)
*H04N 23/57* (2023.01)

(56) References Cited

U.S. PATENT DOCUMENTS 11,238,340 B1* 2/2022 Anderson ................. G06N 3/02
2022/0373806 A1* 11/2022 Stroud ............... G02B 27/0176
2022/0385796 A1* 12/2022 Tam ....................... H04N 23/57

FOREIGN PATENT DOCUMENTS

WO 2014209821 A1 12/2014
WO 2016118643 A1 7/2016

* cited by examiner

DISPLAY DEVICE AND HEAD MOUNTED DISPLAY DEVICE

This application claims priority to Korean Patent Application No. 10-2022-0120343, filed on, Sep. 22, 2022, and all the benefits accruing therefrom under 35 U.S.C. § 119, the content of which in its entirety is herein incorporated by reference.

BACKGROUND

1. Field

The disclosure relates to a display device and a head mounted display device.

2. Description of the Related Art

An electronic device may provide virtual reality (VR) that allows a user to have a real-like experience in a virtual world created by a computer. In addition, an electronic device may provide augmented reality (AR) in which virtual information (or an objects) is added to a real world and displayed, and mixed reality (MR) in which VR and AR are mixed. The electronic device may include a head up display for providing such VR and AR.

The AR may refer to a technology for adding an element generated through computer graphic processing to the real world recognized by a user and expressing the element. For example, a virtual object including information related to an object existing in reality may be added to the object and displayed together by using AR technology.

The AR may be implemented through various devices. Representatively, the AR may be implemented through a wearable electronic device such as a glasses-type wearable electronic device and a head mounted display (HMD).

In the glasses-type wearable electronic device, an image may be displayed on a lens of glasses to implement the AR. By projecting light onto the lens of the glasses, an image may be displayed on the lens. For example, a projector with a very small size (for example, a micro projector, or a pico projector) may be used. An example of such a projector may include a laser scanning display (LSD), a digital micromirror display (DMD), or a liquid crystal on silicon (LCoS). In addition, an image may be displayed on the lens using a transparent display.

SUMMARY

Embodiments of the disclosure provide a display device with improved reliability by accurately detecting a pupil and a gaze direction of a user, and minimizing interference with the user when tracking the gaze of the user.

However, an object of the disclosure is not limited to the above-described objects, and may be variously expanded without departing from the spirit and scope of the disclosure.

According to embodiments of the disclosure, a display device includes a display portion including a first surface, from which light is emitted in a first direction, and a second surface opposite to the first surface, a first optical portion disposed on the first surface, and a second optical portion disposed on the first surface to be spaced apart from the first optical portion in a second direction crossing the first direction. In such embodiments, each of the first optical portion and the second optical portion includes a multi-channel lens, through which the light emitted from the first surface passes, a first infrared light source, a first camera, and a first lens frame coupled to the multi-channel lens in the first direction, where the first lens frame supports at least a portion of the multi-channel lens. In such embodiments, the first lens frame includes a first recess structure, in which the first infrared light source is disposed, and a second recess structure, in which the first camera is disposed.

According to an embodiment, the first recess structure and the second recess structure may be adjacent to a lower portion of a pupil of a user in a state in which the display device is worn by the user.

According to an embodiment, each of the first optical portion and the second optical portion may further include a second infrared light source, and the first lens frame may further include a third recess structure in which the second infrared light source is disposed.

According to an embodiment, the second recess structure may be disposed in a third direction crossing the first direction and the second direction from a center portion of the multi-channel lens, and the second recess structure may be disposed between the first recess structure and the third recess structure.

According to an embodiment, the multi-channel lens may include a plurality of side surfaces inclined with respect to the first surface and a plurality of upper surfaces through which the light passes, the first recess structure may be disposed to be inclined on a first side surface among the plurality of side surfaces, and the second recess structure may be disposed on a first boundary surface between the plurality of side surfaces.

According to an embodiment, an opening, through which the plurality of side surfaces and the plurality of upper surfaces of the multi-channel lens are disposed, may be defined through the first lens frame.

According to an embodiment, the third recess structure may be disposed to be inclined on a second side surface adjacent to the first side surface among the plurality of side surfaces, and the first boundary surface may be between the first side surface and the second side surface.

According to an embodiment, a number of the plurality of side surfaces and a number of the plurality of upper surfaces of the multi-channel lens may each correspond to a number of lenses included in the multi-channel lens.

According to an embodiment, each of the first optical portion and the second optical portion may further include a second lens frame coupled to the first lens frame in the first direction to cover the plurality of side surfaces of the multi-channel lens.

According to an embodiment, a first opening, through which the plurality of upper surfaces of the multi-channel lens and the first camera are exposed to an outside, a second opening, through which the second recess structure of the first lens frame disposed, and a third opening, through which the third recess structure of the first lens frame disposed, may be defined through the second lens frame.

According to an embodiment, the plurality of upper surfaces may include a first upper surface extending from the first side surface, the first infrared light source may be spaced apart from the first side surface, and disposed adjacent to a boundary line between the first side surface and the first upper surface, and the first camera may be disposed adjacent to an edge of the multi-channel lens.

According to an embodiment, the first recess structure and the second recess structure may not overlap the plurality of upper surfaces of the multi-channel lens when viewed in a plan view.

According to an embodiment, the first lens frame may have a ring-like shape covering an edge of the multi-channel lens in the first direction, and each of the first recess structure and the second recess structure may protrude from one side of the ring-like shape in the first direction.

According to an embodiment, the multi-channel lens may include a first lens, a second lens, a third lens, and a fourth lens disposed sequentially in a counterclockwise direction, the first lens and the second lens may be disposed to face the lower portion of the pupil of the user in the state in which the display device is worn by the user, the third lens and the fourth lens may be disposed to face an upper portion of the pupil of the user in the state in which the display device is worn by the user, the first recess structure may be disposed adjacent to the first lens, and the second recess structure may be disposed on a boundary surface between the first lens and the second lens.

According to an embodiment, the first camera may detect a position of the pupil of the user through light emitted from the first infrared light source and reflected by the pupil of the user.

According to embodiments of the disclosure, a head mounted display device includes a display portion including a first surface, from which light is emitted in a first direction, and a second surface opposite to the first surface, a first optical portion disposed on the first surface, and a second optical portion disposed on the first surface spaced apart from the first optical portion in a second direction crossing the first direction. In such embodiments, each of the first optical portion and the second optical portion includes a multi-channel lens including light transmitting surfaces, through which the light emitted from the first surface passes, and side surfaces surrounding the light transmitting surfaces, a first infrared light source, and a first camera. In such an embodiment, the first infrared light source and the first camera are disposed in an adjacent area of the side surfaces.

According to an embodiment, the first infrared light source and the first camera may be disposed adjacent to a lower portion of a pupil of a user in a state in which the head mounted display device is worn by the user.

According to an embodiment, each of the first optical portion and the second optical portion may further include a second infrared light source, the second infrared light source may be disposed in an adjacent area of the side surfaces, and the first camera may be disposed between the first infrared light source and the second infrared light source.

According to an embodiment, the first infrared light source and the first camera may not overlap the light transmitting surfaces when viewed in a plan view.

According to an embodiment, the first infrared light source and the first camera may be disposed to be spaced apart from a center portion of the multi-channel lens in a third direction, the first camera may be disposed adjacent to an edge of the multi-channel lens compared to the first infrared light source, and the third direction may cross the first direction and the second direction.

In the display device according to embodiments of the disclosure, a display device with improved reliability may be provided by minimizing interference caused by a movement of an object (for example, eyelashes of a user) in a state in which the display device is worn by the user and securing an area where infrared light may be emitted.

However, features of the disclosure is not limited to those described above, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
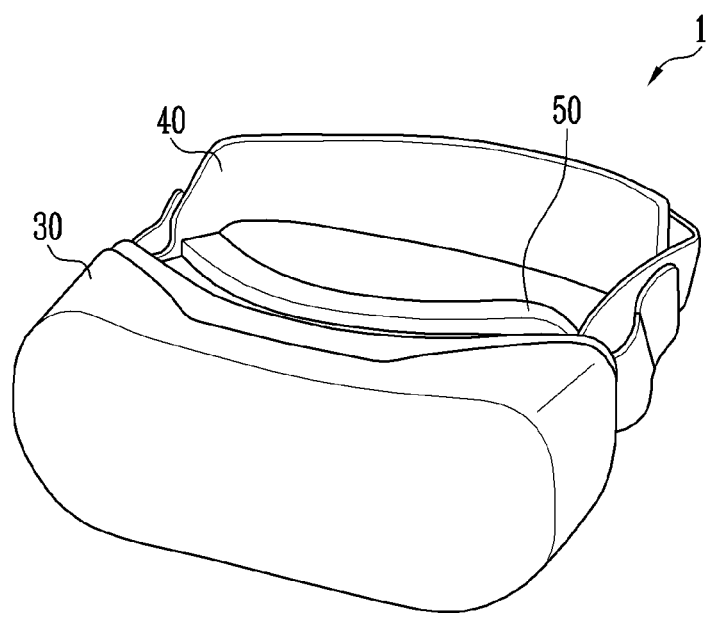
FIG. 1 is a perspective view schematically illustrating a display device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, a case where a component (an area, a layer, a portion, or the like) is "on", "connected to," or "coupled to" another component, the case refers to a case where the portion may be directly connected/coupled onto the other component or a third component may be disposed between them.

The same reference numerals refer to the same components. In addition, in the drawings, thicknesses, ratios, and dimensions of the components are exaggerated for effective description of technical contents."

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
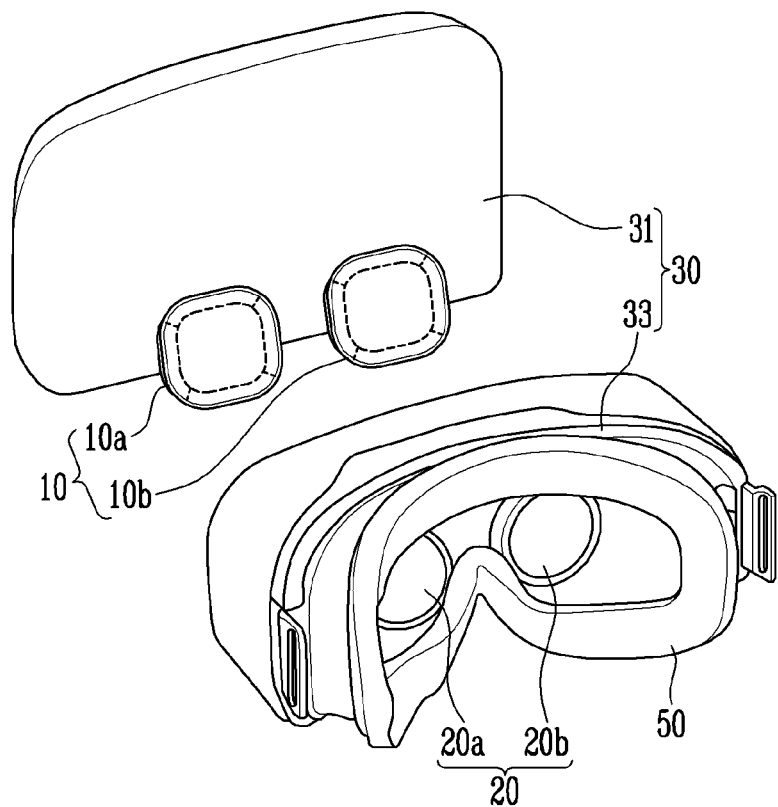
FIG. 2 is an exploded perspective view illustrating an example of the display device of FIG. 1.
Figure 3:
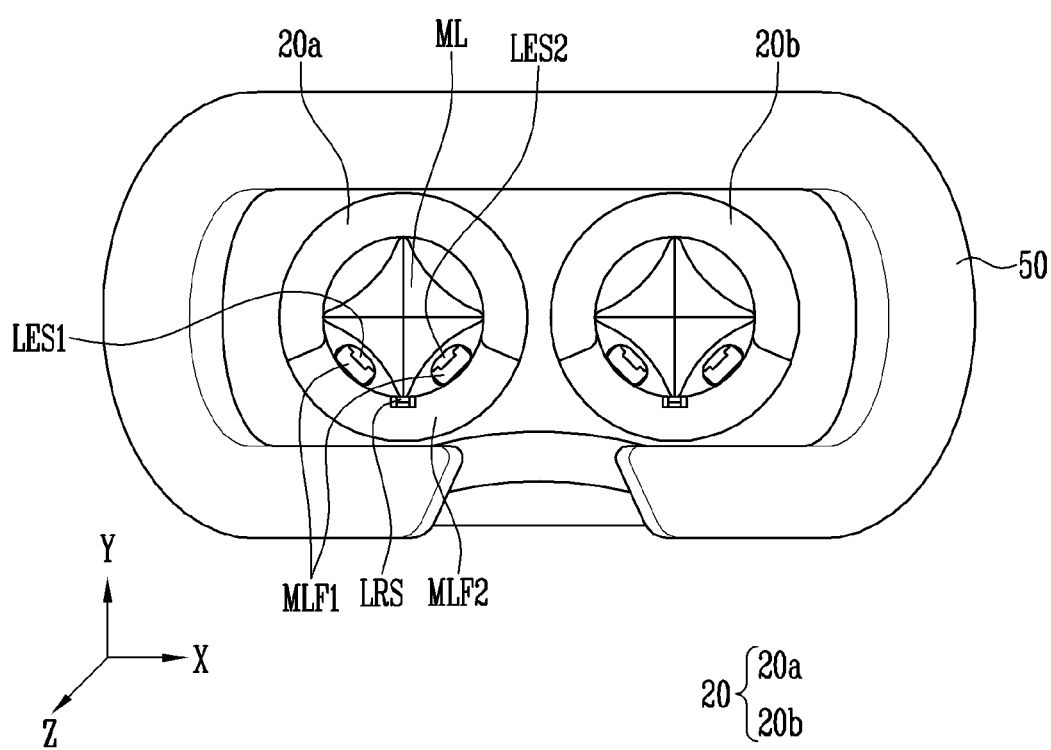
FIG. 3 is a plan view of the display device of FIG. 1.

FIG. 1 is a perspective view schematically illustrating a display device according to embodiments of the disclosure of the disclosure. FIG. 2 is an exploded perspective view illustrating an example of the display device of FIG. 1. FIG. 3 is a plan view of the display device of FIG. 1.

Referring to FIGS. 1 and 2, an embodiment of the display device 1 may include a head mounted display device configured to be mounted on a head of a user (not shown) to provide a screen on which a picture or an image is displayed to the user.

The display device 1 may include a see-through type that provides augmented reality based on actual external objects visible therethrough, and a see-closed type that provides virtual reality to the user with a screen independent of an external object. Hereinafter, embodiments where the display device 1 is a see-closed type of head mounted display device will be described for convenience of description, but the disclosure is not limited thereto.

Referring to FIGS. 1 and 2, an embodiment of the display device 1 may include a display portion 10, an optical portion 20, a case portion 30, a fixing portion 40, and a cushion portion 50.

In an embodiment, the display portion 10 may provide the image. The display portion 10 may emit light to provide the picture and/or the image. The display portion 10 may be received (or accommodated) in the case portion 30. The display portion 10 may be configured to be opaque, transparent, or translucent according to a type of the display device 1. The display portion 10 may include a display panel for displaying the picture or the image. In an embodiment, for example, the display portion 10 may include a light emitting display panel including a light emitting element. In an embodiment, for example, the display portion 10 may include an organic light emitting display panel using an organic light emitting diode including an organic light emitting layer, a micro light emitting diode display panel using a micro light emitting diode (LED), a quantum dot light emitting display panel using a quantum dot LED including a quantum dot light emitting layer, or an inorganic light emitting display panel using an inorganic light emitting element including an inorganic semiconductor.

In an embodiment, the display portion 10 may include a first display portion 10a and a second display portion 10b. The first display portion 10a may be disposed to face a left eye of the user, and the second display portion 10b may be disposed to face a right eye of the user.

In an embodiment, the display portion 10 may include a first surface (or a front surface), from which light is emitted to the user, and a second surface (or a rear surface) opposite to the first surface. In such an embodiment, the first surface may be a light emitting surface.

In an embodiment, the optical portion 20 may allow light emitted from the display portion 10 to pass therethrough. The optical portion 20 may refract and/or reflect the light emitted from the display portion 10. In an embodiment, for example, the optical portion 20 may magnify the image provided by the display portion 10. The optical portion 20 may be disposed to face the display portion 10. When the user wears the display device 1, the optical portion 20 may be disposed between the user and the display portion 10. Therefore, the user may recognize light emitted from the display portion 10 and refracted and/or reflected by the optical portion 20.

In an embodiment, the optical portion 20 may include a first optical portion 20a and a second optical portion 20b. The first optical portion 20a may be disposed to face the left eye of the user, and may overlap the first display portion 10a. The second optical portion 20b may be disposed to face the right eye of the user, and may overlap the second display portion 10b.

In an embodiment, the case portion 30 may receive the display portion and the optical portion 20. The case portion 30 may be provided with (or define) a space therein, and the display portion 10 and the optical portion 20 may be disposed in the space. The case portion 30 may protect the display portion 10 and the optical portion 20 from external impact.

In an embodiment, the case portion 30 may include a cover portion 31 and a body portion 33. The case portion 30 may be separated (or separable) into each of the cover portion 31 and the body portion 33, but is not limited thereto, and the cover portion 31 and the body portion 33 may be integrally formed with each other or be fixed to each other. In an embodiment, the cover portion 31 may be disposed on the rear surface of the display portion 10, and the body portion 33 may be disposed on the front surface of the display portion 10.

The fixing portion 40 may mount the case portion 30 on the head of the user. A length of the fixing portion 40 may be adjusted according to a circumference of the head of the user. The fixing portion 40 may include a structure such as a strap or a band connected to the case portion 30. The fixing portion 40 may be attachable to or detachable from the case portion 30.

In an embodiment, the cushion portion 50 may improve a wearing comfort to the user. When the user wears the display device 1, the cushion portion 50 may be disposed between the user and the case portion 30. In an embodiment, for example, the cushion portion 50 may be attached to the case portion 30. In an embodiment, for example, the cushion portion 50 may be detachable from the case portion 30, and may be omitted from the display device 1.

In an embodiment, the display device 1 may further include a control portion (not shown). The control portion may perform an operation for calculation of a position of a pupil of the user, calculation of a direction of a gaze of the user, image processing (for example, image mapping) based on the calculated position of the pupil of the user (or direction of the gaze), displaying a processed image on the display portion 10, or the like.

The control portion may be implemented as a dedicated processor including an embedded processor or the like, a general-purpose processor including a central processing unit, an application processor, or the like, and/or the like, but is not limited thereto.

Referring to FIGS. 1, 2, and 3, an embodiment of the display device 1 may include the optical portion 20 through which the light emitted from the display portion 10 passes.

In an embodiment, the optical portion 20 may include the first optical portion 20a and the second optical portion 20b. The second optical portion 20b may be disposed to be spaced apart from the first optical portion 20a in a second direction (for example, a +x direction). The first optical portion 20a may be a configuration positioned to face the left eye of the user and the second optical portion 20b may be a configuration positioned to face the right eye of the user, and the first optical portion 20a and the second optical portion 20b may have structures substantially identical or similar to each other, but are not limited thereto.

Herein, the optical portion 20 may refer to the first optical portion 20a and/or the second optical portion 20b.

In an embodiment, the optical portion 20 may include a multi-channel lens ML, a first lens frame MLF1, a second lens frame MLF2, a first infrared light source LES1, a second infrared light source LES2, and a first camera LRS.

In an embodiment, the multi-channel lens ML is a focusing optical system interposed between an eyeball of the user and the front surface of the display portion 10. Although an embodiment where a focusing optical system of the optical portion 20 includes a multi-channel lens will hereinafter be described in detail, but is not limited thereto. Alternatively, the focusing optical system may include, for example, various types of lenses such as a convex lens, a concave lens, a spherical lens, an aspherical lens, a single lens, a compound lens, a standard lens, a narrow angle lens, a wide angle lens, a fixed focus lens, or a variable focus lens.

In an embodiment, the first infrared light source LES1, the second infrared light source LES2, and the first camera LRS may be a sensor for detecting a gaze direction viewed by the user wearing the display device 1. The display device 1 may track the gaze of the user through the first infrared light source LES1 and the first camera LRS, but may further include the second infrared light source LES2 to secure reliability.

In an embodiment, the first infrared light source LES1 and the second infrared light source LES2 may emit infrared light. The first camera LRS may convert light incident thereon into an electrical signal. In an embodiment, for example, the first camera LRS may include a semiconductor element such as a charged coupled device (CCD) or a complementary metal-oxide semiconductor (CMOS).

The first camera LRS may convert light emitted from the first infrared light source LES1 and/or the second infrared light source LES2 reflected by the pupil of the user into the electrical signal to detect the pupil of the user, and track the gaze direction of the user. The tracked gaze direction may be used to move a center of a virtual image in correspondence with the gaze direction.

In an embodiment, the first lens frame MLF1 may be a structure for supporting at least a portion of the multi-channel lens ML. The first lens frame MLF1 may include recess structures in which the first infrared light source LES1, the second infrared light source LES2, and the first camera LRS are mounted (or disposed).

In an embodiment, the second lens frame MLF2 may be a structure for supporting and/or protecting at least a portion of the multi-channel lens ML and the first lens frame MLF1.

In an embodiment, the first infrared light source LES1 and the second infrared light source LES2 may be mounted on the first lens frame MLF1 to be spaced apart from the multi-channel lens ML by a predetermined distance.

In an embodiment, the first camera LRS may be disposed in an area adjacent to the first infrared light source LES1 and the second infrared light source LES2, and may be disposed between the first infrared light source LES1 and the second infrared light source LES2. In an embodiment, for example, the first camera LRS may be disposed in a third direction (for example, a −Y direction) crossing a first direction (for example, a +Z direction) facing the pupil of the user in a state in which the display device is worn. The first infrared light source LES1 may be disposed on a left side (or an upper left side) with respect to the first camera LRS. The second infrared light source LES2 may be disposed on a right side (or an upper right side) with respect to the first camera LRS.

In an embodiment, the first infrared light source LES1, the second infrared light source LES2, and the first camera LRS may be disposed at a position adjacent to a lower portion of the pupil of the user (for example, the —Y direction) when the user wears the display device 1.

In an embodiment, as the first infrared light source LES1, the second infrared light source LES2, and the first camera LRS are disposed in an area adjacent to the lower portion of the pupil of the user, interference caused by an object (for example, the eyelashes of the user) may be effectively prevented (or minimized). Therefore, the first infrared light source LES1, the second infrared light source LES2, and the first camera LRS may detect information on the pupil position and/or the gaze direction of the user of which reliability is improved.

In addition, as the first infrared light source LES1 and the second infrared light source LES2 are mounted and disposed on the structure of the first lens frame MLF1, the first infrared light source LES1 and the second infrared light source LES2 may be disposed adjacent to the multi-channel lens ML and spaced apart from the multi-channel lens ML. Therefore, light may be emitted toward the pupil of the user while minimizing interference due to a shape of the multi-channel lens ML.

Figure 4:
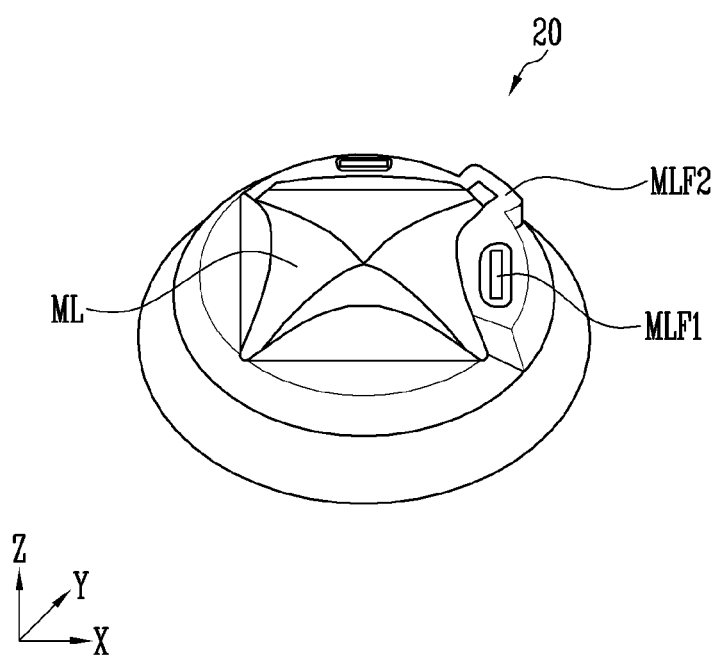
FIG. 4 is a perspective view illustrating an example of an optical portion of FIG. 2.

FIG. 4 is a perspective view illustrating an example of the optical portion of FIG. 2.

Referring to FIG. 4, in an embodiment, the optical portion 20 may have a schematic hemispherical shape.

In an embodiment, at least a portion of the multi-channel lens ML of the optical portion 20 may be exposed to an outside through an opening defined or formed in the second lens frame MLF2, and at least a portion of the multi-channel lens ML may not be exposed to the outside by the first lens frame MLF1 and the second lens frame MLF2. The light emitted through the display portion (for example, the display portion 10 of FIG. 1) may pass through at least the portion of the multi-channel lens ML exposed to the outside.

In an embodiment, the first infrared light source (for example, the first infrared light source LES1 of FIG. 3) and the first camera (for example, the first camera LRS of FIG.

3) may be exposed to the outside through the opening defined or formed in the second lens frame MLF2.

Figure 5:
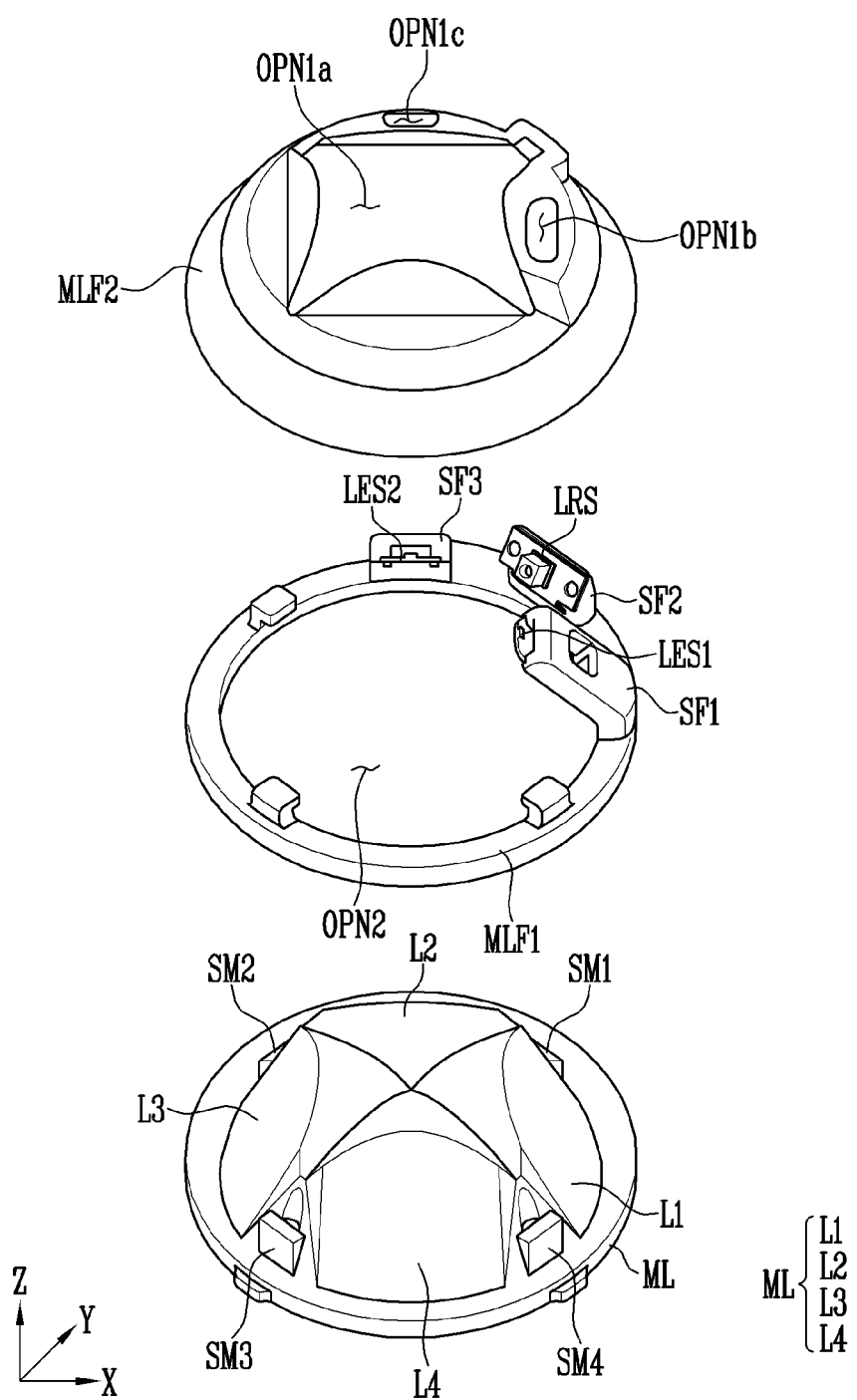
FIG. 5 an exploded perspective view illustrating an example of the optical portion of FIG. 4.

FIG. 5 is an exploded perspective view illustrating an example of the optical portion of FIG. 4.

Referring to FIG. 5, in an embodiment, the optical portion 20 may include the multi-channel lens ML, the first lens frame MLF1, and the second lens frame MLF2.

In an embodiment, the multi-channel lens ML may include a plurality of lenses. In an embodiment, for example, the multi-channel lens ML may include a first lens L1, a second lens L2, a third lens L3, and a fourth lens L4. In an alternative embodiment, for example, a portion of the first lens L1, the second lens L2, the third lens L3, and the fourth lens L4 may be omitted. In another alternative embodiment, for example, the multi-channel lens ML may further include a fifth lens or more lenses. Hereinafter, embodiments in which the multi-channel lens ML includes the first lens L1, the second lens L2, the third lens L3, and the fourth lens L4 will be described in detail for convenience of description.

In an embodiment, the multi-channel lens ML may have an approximately circular shape when viewed in a plan view. The first lens L1, the second lens L2, the third lens L3, and the fourth lens L4 may be disposed to surround a central axis in the Z direction (for example, a central axis Zaxis of FIG. 6) of the optical portion 20. The first lens L1 and the third lens L3 may be symmetrically disposed with respect to the central axis. The second lens L2 and the fourth lens L4 may be symmetrically disposed with respect to the central axis.

In an embodiment, each of the first lens L1, the second lens L2, the third lens L3, and the fourth lens L4 may provide a plurality of channels through which the light emitted from the display portion (for example, the display portion of FIG. 1) passes. Light emitted from different areas of the display portion may pass through different paths through respective channels. The first lens L1, the second lens L2, the third lens L3, and the fourth lens L4 may magnify the light emitted from the different areas of the display portion 10 with a same magnification as or different magnifications from each other. Each light passing through each of the first lens L1, the second lens L2, the third lens L3, and the fourth lens L4 may include a partial image and/or a partial picture for constituting one complete image, the light may be focused on the pupil of the user to provide one complete image to the user.

In an embodiment, the first lens L1, the second lens L2, the third lens L3, and the fourth lens L4 may be separated (or separable) from each other. In an alternative embodiment, for example, the first lens L1, the second lens L2, the third lens L3, and the fourth lens L4 may be integrally formed with each other as a single unitary and indivisible part.

In an embodiment, the multi-channel lens ML may protrude in the first direction (for example, the +Z direction). In an embodiment, for example, the first direction is a direction facing the pupil of the user in the state in which the display device 1 is worn.

In an embodiment, the multi-channel lens ML may include support members. The support members may be disposed between the first lens L1, the second lens L2, the third lens L3, and the fourth lens L4. In an embodiment, for example, a first support member SM1 may be disposed between the first lens L1 and the second lens L2. A second support member SM2 may be disposed between the second lens L2 and the third lens L3. A third support member SM3 may be disposed between the third lens L3 and the fourth lens L4. A fourth support member SM4 may be disposed between the fourth lens L4 and the first lens L1.

In an embodiment, the first lens frame MLF1 may be coupled to the multi-channel lens ML in the first direction (for example, the +z direction).

In an embodiment, the first lens frame MLF1 may have a ring-like shape. In an embodiment, for example, an opening OPN2, through which the multi-channel lens ML passes or are disposed, may be defined through the first lens frame MF1. In an embodiment, the first lens frame MLF1 may support an edge of the multi-channel lens ML. The opening OPN2 may include a closed curve having the same shape as a shape of an edge of the first lens frame MLF1.

In an embodiment, the first lens frame MLF1 may include a first recess structure SF1, a second recess structure SF2, and a third recess structure SF3. In an embodiment, for example, the first recess structure SF1, the second recess structure SF2, and the third recess structure SF3 may be structures protruding in the first direction (for example, the +z direction).

In an embodiment, the first recess structure SF1 may include a recess (or a recessed portion) on which the first infrared light source LES1 may be mounted. The second recess structure SF2 may include a recess on which the first camera LRS may be mounted. The third recess structure SF3 may include a recess in which the second infrared light source LES2 may be mounted.

In an embodiment, the first recess structure SF1 and the third recess structure SF3 may be disposed in an area that does not overlap an area through which light of the multi-channel lens ML passes when viewed in a plan view in the Z direction (or light transmitting surfaces of the multi-channel lens ML). The first infrared light source LES1 mounted on the first recess structure SF1 and the second infrared light source LES2 mounted on the third recess structure SF3 may emit a light source toward the pupil of the user.

In an embodiment, as the first infrared light source LES1 and the second infrared light source LES2 do not directly contact the multi-channel lens ML, and mounted on the first recess structure SF1 and the third recess structure SF3, respectively, infrared light may be emitted with a relatively wider divergence angle.

In an embodiment, the first recess structure SF1 may be disposed to overlap one lens (or a corresponding lens, for example, the first lens L1) of the multi-channel lens ML when viewed in a plan view. The third recess structure SF3 may be disposed to overlap a lens (or a corresponding lens, for example, the second lens L2) adjacent to the lens overlapping the first recess structure SF1 of the multi-channel lens ML.

In an embodiment, the second recess structure SF2 may be disposed between the first recess structure SF1 and the third recess structure SF3. In an embodiment, for example, the second recess structure SF2 may be disposed on a boundary surface between the first lens L1 and the second lens L2. In an embodiment, for example, the second recess structure SF2 may be coupled to the first support member SM1 of the multi-channel lens ML.

In an embodiment, the second lens frame MLF2 may be coupled to the multi-channel lens ML and the first lens frame MLF1 in the first direction (for example, the +Z direction). In an embodiment, for example, the second lens frame MLF2 may be a structure for supporting the first lens frame MLF1 and the multi-channel lens ML or protecting the first lens frame MLF1 and the multi-channel lens ML from external impact. In an alternative embodiment, for example, the second lens frame MLF2 may be omitted.

In an embodiment, a first opening OPN1a for exposing at least a portion of the multi-channel lens ML and the first camera LRS to the outside may be defined in the second lens frame MLF2. The portion of the multi-channel lens ML exposed to the outside through the first opening OPN1a may be an area through which the light emitted from the display portion (for example, the display portion 10 of FIG. 1) is transmitted.

In an embodiment, a second opening OPN1b, through which the first recess structure SF1 passes or is disposed, and a third opening OPN1c, through which the third recess structure SF3 passes or is disposed, may be defined in the second lens frame MLF2. In an embodiment, for example, the first infrared light source LES1 mounted on the first recess structure SF1 may be exposed to the outside through the second opening OPN1b. The second infrared light source LES2 mounted on the third recess structure SF3 may be exposed to the outside through the third opening OPN1c.

In an embodiment, the second recess structure SF2 may be coupled to the second lens frame MLF2 in the first direction (for example, the +Z direction), and the first camera LRS mounted on the second recess structure SF2 may be exposed to the outside through the first opening OPN1a.

Figure 6:
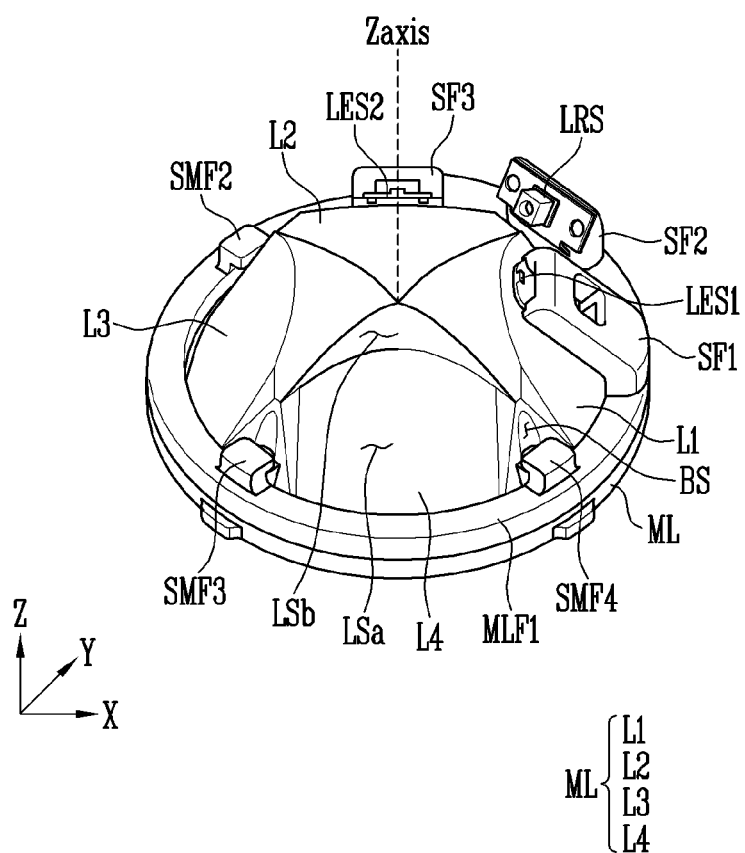
FIG. 6 is a perspective view illustrating an example of the optical portion of FIG. 4.

FIG. 6 is a perspective view illustrating an example of the optical portion of FIG. 4.

Referring to FIG. 6, the first lens frame MLF1 may be coupled to the multi-channel lens ML.

In an embodiment, the first lens L1, the second lens L2, the third lens L3, and the fourth lens L4 of the multi-channel lens ML may be disposed to surround the central axis Zaxis of the optical portion 20.

In an embodiment, each of the first lens L1, the second lens L2, the third lens L3, and the fourth lens L4 may include a side surface LSa extending from an edge of the lens and an upper surface LSb extending from the side surface LSa. In an embodiment, for example, the upper surfaces LSb for the first lens L1, the second lens L2, the third lens L3, and the fourth lens L4 may meet each other at the central axis Zaxis of the optical portion 20. A shape of the upper surfaces LSb of the first lens L1, the second lens L2, the third lens L3, and the fourth lens L4 may be a diamond shape when viewed in a plan view.

In an embodiment, the side surfaces LSa may extend to be inclined in a direction facing the central axis Zaxis of the optical portion 20 from the edge of the multi-channel lens ML. A width of the side surfaces LSa may become narrower as being toward the central axis Zaxis. In an embodiment, for example, the upper surfaces LSb may extend from the side surfaces LSa and extend in the direction facing the central axis Zaxis. The side surfaces LSa and the upper surfaces LSb may form an acute angle or an obtuse angle with each other.

In an embodiment, boundary surfaces BS may be disposed between the side surfaces LSa. In an embodiment, for example, the boundary surface BS may be formed between the side surface LSa of the fourth lens L4 and the side surface LSa of the first lens L1.

Referring to FIGS. 5 and 6, the plurality of side surfaces LSa and the plurality of upper surfaces LSb may be exposed to the outside in a state in which the plurality of side surfaces LSa and the plurality of upper surfaces LSb are coupled to the first lens frame MLF1. In an embodiment, for example, the plurality of upper surfaces LSb may be exposed to the outside in a state in which the plurality of upper surfaces LSb are coupled to the first lens frame MLF1 and the second lens frame MLF2, but the plurality of side surfaces LSa may be covered by the second lens frame MLF2 and may not be exposed to the outside.

In an embodiment, the first lens frame MLF1 may include the first recess structure SF1, the second recess structure SF2, and the third recess structure SF3 protruding in the first direction (for example, the +Z direction).

In an embodiment, in the state in which the display device is worn, the first lens L1 and the second lens L2 may be disposed to face the lower portion of the pupil of the user, and the third lens L3 and the fourth lens L4 may be disposed to face the upper portion of the pupil of the user. In an embodiment, for example, the first recess structure SF1 may be disposed adjacent to the side surface LSa of the first lens L1. The third recess structure SF3 may be disposed adjacent to the side surface Lsa of the second lens L2. The second recess structure SF2 may be disposed on the boundary surface between the first lens L1 and the second lens L2.

In an embodiment, the second recess structure SF2 may be disposed between the first recess structure SF1 and the third recess structure SF3.

In an embodiment, each of the first recess structure SF1 and the third recess structure SF3 may extend from the edge of the first lens frame MLF1 and may be disposed to be inclined to overlap the side surface LSa.

In an embodiment, the first infrared light source LES1 may be mounted on the first recess structure SF1 and disposed at a position adjacent to a boundary line between the side surface LSa and the upper surface LSb of the first lens L1.

In an embodiment, the second infrared light source LES2 may be mounted on the third recess structure SF3 and disposed at a position adjacent to the boundary line between the side surface LSa and the upper surface LSb of the second lens L2.

In an embodiment, the first recess structure SF1, the second recess structure SF2, and the third recess structure SF3 may not overlap the upper surfaces LSb when viewed in a plan view.

In an embodiment, the display device may emit light toward the pupil of the user through the first infrared light source LES1 and the second infrared light source LES2 to detect the position of the pupil while preventing (or minimizing) interference of the light due to a movement of the user (for example, a movement of the eyelashes of the user) and the side surface LSa disposed to be inclined.

In an embodiment, the first recess structure SF1 and the third recess structure SF3 may prevent a change of a position of the first and second infrared light sources LES1 and LES2 or damage and/or deformation of the first and second infrared light sources LES1 and LES2 due to external impact.

Referring to FIGS. 5 and 6, the first lens frame MLF1 may include fixing members for coupling with the multi-channel lens ML. In an embodiment, for example, the first lens frame MLF1 may include a second fixing member SMF2 coupled to the second support member SM2, a third fixing member SMF3 coupled to the third support member SM3, and a fourth fixing member SMF4 coupled to the fourth support member SM4. In embodiment, for an example, the second recess structure SF2 may be coupled to the first support member SM1 of the multi-channel lens ML.

In an embodiment, the first camera LRS may be exposed to the outside through the opening OPN2 of the first lens frame MLF1 and the first opening OPN1a of the second lens frame MLF2 together with the upper surfaces LSb of the multi-channel lens ML.

Figure 7:
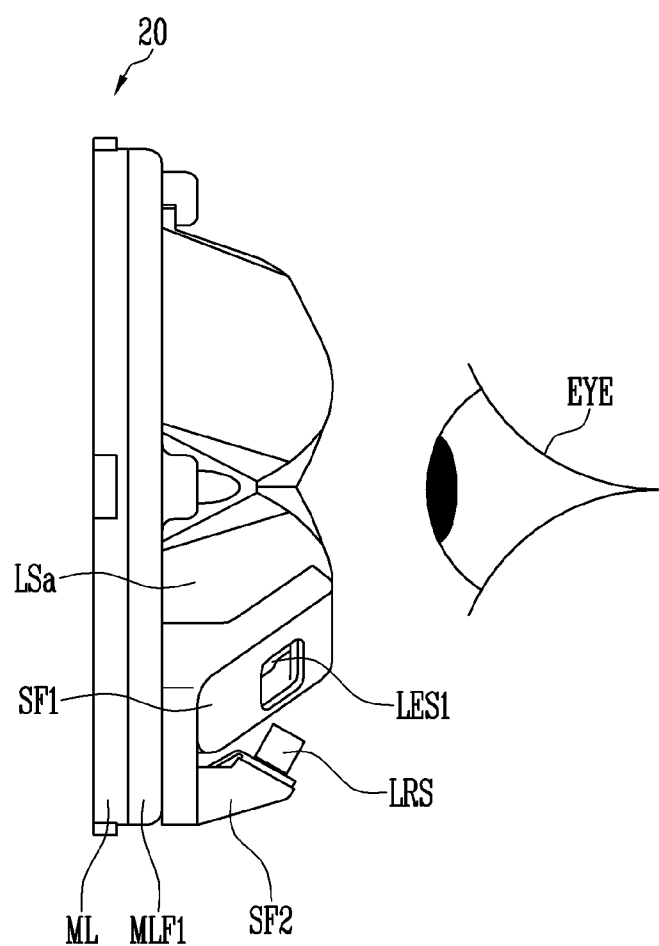
FIG. 7 is a side view of the optical portion in a state in which the display device of FIG. 1 is worn.

FIG. 7 is a side view of the optical portion in the state in which the display device of FIG. 1 is worn.

Referring to FIG. 7, in the state in which the display device is worn, the first infrared light source LES1 and the first camera LRS may be disposed below the pupil EYE of the user.

In an embodiment, the first recess structure SF1 may not overlap the upper surface (for example, the upper surface LSb of FIG. 6) of the multi-channel lens ML through which the light emitted from the display portion (for example, the display portion 10 of FIG. 1) passes, and may be disposed to be spaced apart from the upper surface on the side surface LSa adjacent to the upper surface LSb.

In an embodiment, the first infrared light source LES1 may be mounted on the first recess structure SF1 and emit infrared light toward the pupil of the user, and the emitted light may be reflected by the pupil of the user while preventing (or minimizing) interference due to the inclined side surface LSa of the multi-channel lens ML.

In an embodiment, the first infrared light source LES1 and the first camera LRS may be disposed in an area adjacent to an area facing the lower portion of the pupil of the user. In an embodiment, for example, in a state in which interference due to a movement of an object (for example, the eyelashes) positioned above the pupil of the user is effectively prevented (or minimized), the first camera LRS may image light emitted from the first infrared light source LES1 reflected by the pupil of the user to detect data with improved reliability.

In the display device, as the first infrared light source LES1 and the first camera LRS are disposed at a position where the interference due to the movement of the object (for example, the eyelashes of the user) may be minimized and a limitation of a divergence angle may be minimized in the state in which the display device is worn, a display device with improved reliability may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display portion including a first surface, from which light is emitted in a first direction, and a second surface opposite to the first surface;
   a first optical portion disposed on the first surface; and
   a second optical portion disposed on the first surface to be spaced apart from the first optical portion in a second direction crossing the first direction,
   wherein each of the first optical portion and the second optical portion comprises:
   a multi-channel lens, through which the light emitted from the first surface passes;
   a first infrared light source;
   a first camera; and
   a first lens frame coupled to the multi-channel lens in the first direction, wherein the first lens frame supports at least a portion of the multi-channel lens, and
   the first lens frame includes a first recess structure, in which the first infrared light source is disposed, and a second recess structure in which the first camera is disposed.

2. The display device according to claim 1, wherein the first recess structure and the second recess structure are adjacent to a lower portion of a pupil of a user in a state in which the display device is worn by the user.

3. The display device according to claim 2, wherein each of the first optical portion and the second optical portion further comprises a second infrared light source, and
   the first lens frame further includes a third recess structure in which the second infrared light source is disposed.

4. The display device according to claim 3, wherein the second recess structure is disposed in a third direction crossing the first direction and the second direction from a center portion of the multi-channel lens, and
   the second recess structure is disposed between the first recess structure and the third recess structure.

5. The display device according to claim 3, wherein the multi-channel lens includes a plurality of side surfaces inclined with respect to the first surface and a plurality of upper surfaces through which the light passes,
   the first recess structure is disposed to be inclined on a first side surface among the plurality of side surfaces, and
   the second recess structure is disposed on a first boundary surface between the plurality of side surfaces.

6. The display device according to claim 5, wherein an opening, through which the plurality of side surfaces and the plurality of upper surfaces of the multi-channel lens are disposed, is defined through the first lens frame.

7. The display device according to claim 5, wherein the third recess structure is disposed to be inclined on a second side surface adjacent to the first side surface among the plurality of side surfaces, and
   the first boundary surface is between the first side surface and the second side surface.

8. The display device according to claim 5, wherein a number of the plurality of side surfaces and a number of the plurality of upper surfaces of the multi-channel lens each corresponds to a number of lenses included in the multi-channel lens.

9. The display device according to claim 5, wherein each of the first optical portion and the second optical portion further comprises a second lens frame coupled to the first lens frame in the first direction to cover the plurality of side surfaces of the multi-channel lens.

10. The display device according to claim 9, wherein a first opening, through which the plurality of upper surfaces of the multi-channel lens and the first camera are exposed to an outside, a second opening, through which the second recess structure of the first lens frame is disposed, and a third opening, through which the third recess structure of the first lens frame is disposed, are defined through the second lens frame.

11. The display device according to claim 5, wherein the plurality of upper surfaces include a first upper surface extending from the first side surface,
   the first infrared light source is spaced apart from the first side surface, and disposed adjacent to a boundary line between the first side surface and the first upper surface, and
   the first camera is disposed adjacent to an edge of the multi-channel lens.

12. The display device according to claim 5, wherein the first recess structure and the second recess structure do not overlap the plurality of upper surfaces of the multi-channel lens when viewed in a plan view.

13. The display device according to claim 2, wherein the first lens frame has a ring-like shape covering an edge of the multi-channel lens in the first direction, and
each of the first recess structure and the second recess structure protrudes from one side of the ring-like shape in the first direction.

14. The display device according to claim 2, wherein the multi-channel lens includes a first lens, a second lens, a third lens, and a fourth lens disposed sequentially in a counter-clockwise direction,
the first lens and the second lens are disposed to face the lower portion of the pupil of the user in the state in which the display device is worn by the user,
the third lens and the fourth lens are disposed to face an upper portion of the pupil of the user in the state in which the display device is worn by the user,
the first recess structure is disposed adjacent to the first lens, and
the second recess structure is disposed on a boundary surface between the first lens and the second lens.

15. The display device according to claim 2, wherein the first camera detects a position of the pupil of the user through light emitted from the first infrared light source and reflected by the pupil of the user.

16. A head mounted display device comprising:
a display portion including a first surface, from which light is emitted in a first direction, and a second surface opposite to the first surface;
a first optical portion disposed on the first surface; and
a second optical portion disposed on the first surface to be spaced apart from the first optical portion in a second direction crossing the first direction,
wherein each of the first optical portion and the second optical portion comprises:
a multi-channel lens including light transmitting surfaces, through which the light emitted from the first surface passes, and side surfaces surrounding the light transmitting surfaces;
a first infrared light source; and
a first camera, and
the first infrared light source and the first camera are disposed in an adjacent area of the side surfaces.

17. The head mounted display device according to claim 16, wherein the first infrared light source and the first camera are disposed adjacent to a lower portion of a pupil of a user in a state in which the head mounted display device is worn by the user.

18. The head mounted display device according to claim 17, wherein each of the first optical portion and the second optical portion further comprises a second infrared light source,
the second infrared light source is disposed in an adjacent area of the side surfaces, and
the first camera is disposed between the first infrared light source and the second infrared light source.

19. The head mounted display device according to claim 17, wherein the first infrared light source and the first camera do not overlap the light transmitting surfaces when viewed in a plan view.

20. The head mounted display device according to claim 16, wherein the first infrared light source and the first camera are disposed to be spaced apart from a center portion of the multi-channel lens in a third direction,
the first camera is disposed adjacent to an edge of the multi-channel lens compared to the first infrared light source, and
the third direction crosses the first direction and the second direction.

* * * * *